United States Patent [19]

Thomas

[11] Patent Number: 4,612,168

[45] Date of Patent: Sep. 16, 1986

[54] PROCESS FOR REFINING BRASS AND ALUMINUM SCRAPS

[75] Inventor: Harold K. Thomas, Phoenix, Ariz.

[73] Assignee: Corban International, Ltd, Anguilla, West Indies

[21] Appl. No.: 739,525

[22] Filed: May 31, 1985

[51] Int. Cl.$^4$ .............................................. C22C 1/02
[52] U.S. Cl. ...................... 420/587; 75/63; 75/72; 423/481; 423/625
[58] Field of Search ............... 75/72, 76, 63; 420/477, 420/478, 587; 423/481, 625

[56] References Cited

U.S. PATENT DOCUMENTS

| | | | |
|---|---|---|---|
| 970,686 | 9/1910 | Clamer | 75/63 |
| 2,452,665 | 11/1948 | Kroll et al. | 75/63 |
| 3,853,543 | 12/1974 | Thomas | 75/109 |
| 4,038,068 | 7/1977 | Tyler | 420/478 |

Primary Examiner—Melvyn J. Andrews
Attorney, Agent, or Firm—William H. Drummond

[57] ABSTRACT

A process for refining brass and cuprous chloride includes contacting solid cuprous chloride with molten brass scrap which converts the zinc in the brass scrap to a zinc chloride fume and which reduces the copper values in the cuprous chloride to molten elemental copper. The zinc chloride fume, containing minor quantities of cuprous chloride, is condensed and reduced by contact with aluminum scrap to convert aluminum in the scrap to an aluminum chloride fume and forming a molten zinc-copper-aluminum alloy product. If desired, the aluminum chloride fume can be oxidized with steam to yield an aluminum oxide product and by-product hydrochloric acid.

2 Claims, 1 Drawing Figure

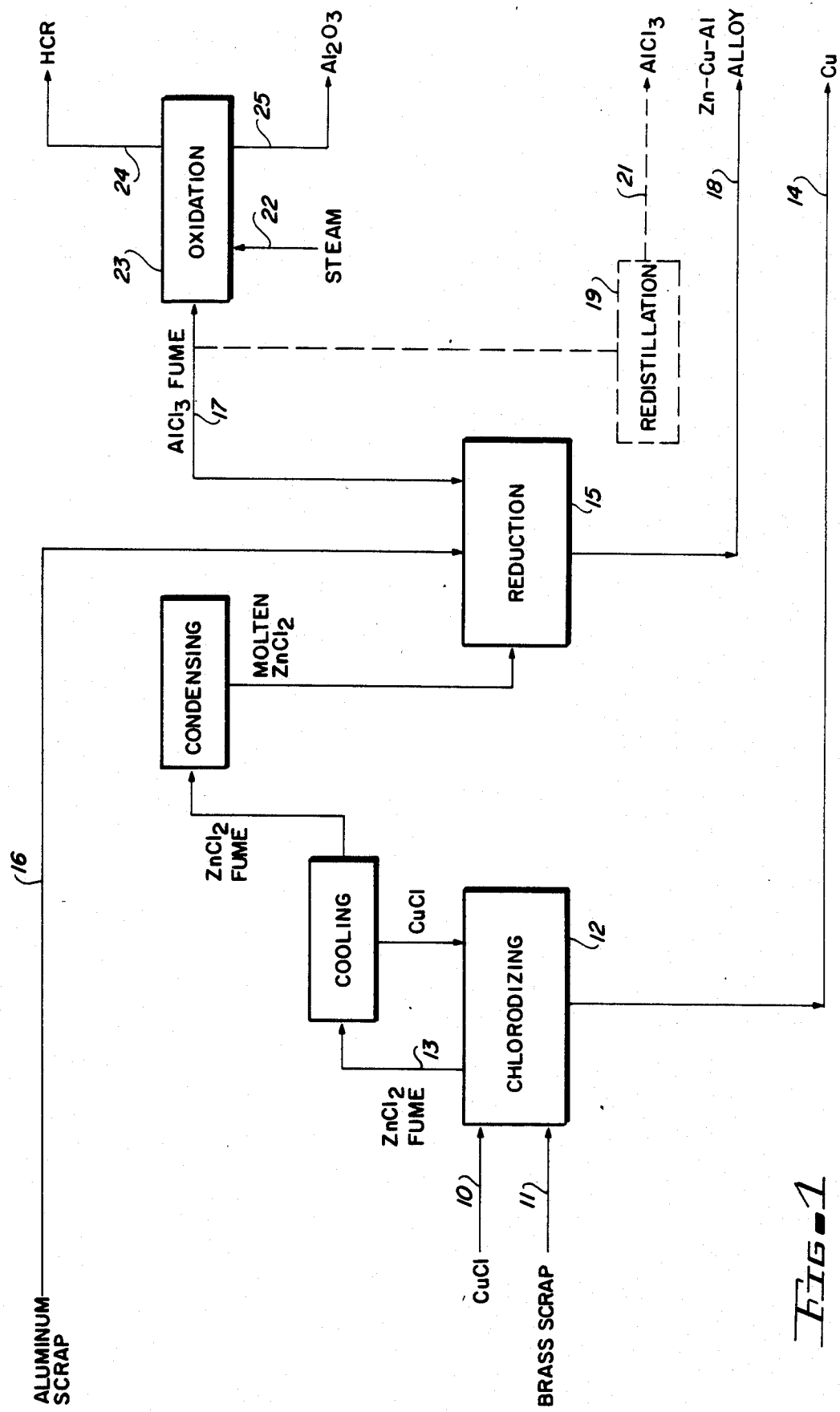

PROCESS FOR REFINING BRASS AND ALUMINUM SCRAPS

This invention relates to a process for separating copper and zinc from brass, and recovering the same as valuable copper and high-grade zinc die-cast alloy.

In a more particular respect, the invention concerns methods for the economical recovery of the component metals or alloys of the component metals of brass scrap and simultaneously recovering copper values from cuprous chloride, the cuprous chloride having been derived from prior art hydro-metallurgical and pyrometallurgical processes for winning copper from its ores, or from copper scraps.

The economic separation of copper and zinc from brass has long been a desired objective. Most methods of separation, however, are not presently economical. For example, zinc may be distilled from copper brass at a relatively low temperature of 1665 F., but the operation has never proved to be economical. Various leaching methods are also known, but the final recovery of copper and zinc from the leach components has not been economical. The nearest approach to an economic leach method is the ferric chloride leach of copper scraps to obtain cuprous chloride and zinc chloride. The cuprous chloride yields readily to hydrogen reduction, but, despite large sums of money expended in development, it has not proven economically feasible.

A prior art process for successfully converting cuprous chloride to metallic copper is disclosed in my issued U.S. Pat. No. 3,853,543, entitled "Process for Producing Elemental Copper by Reacting Molten Cuprous Chloride with Zinc".

Large producers, however, have not converted their conventional copper smelting methods to the ferric leach process for several reasons: first this would entail scrapping their entire existing plant; second, the uncertainty of the cost and availability of zinc of which they would be using in high purity and in large tonnages.

Therefore, a principal object of the present invention is to provide a more economical process for the reduction of cuprous chloride with zinc.

Yet another object of the invention is to provide for an economic refining of copper brass scraps while concomitently providing an economic outlet for cuprous chloride obtained from the ferric chloride leach of copper ores.

Still another object of the invention is to provide for the economic export of surplus cuprous chloride to areas or countries that are required to import copper, but who may have an abundance of copper scrap. The imported cuprous chloride and the copper scrap can be economically converted there into copper and high-grade zinc alloys at a considerably lower cost than the cost of import of copper and zinc.

These and other, further and more specific objects and advantages of the invention will be apparent to those skilled in the art from the following detailed description thereof, taken in conjunction with the drawing in which FIG. 1 is a flow sheet illustrating the presently preferred embodiment of the invention, including an optional aluminum chloride recovery sequence.

Briefly, in accordance with my invention, I have discovered processes which achieve the above-stated objects. These processes include the steps of contacting solid cuprous chloride with a melt of brass scrap in a chloridizing zone to convert zinc in the brass scrap to a zinc chloride fume containing a minor amount of cuprous chloride and forming a molten elemental copper product containing the copper values of the brass scrap and the cuprous chloride. The zinc chloride fume, after separation from the molten copper product is condensed and contacted in a reduction zone with a melt of aluminum to convert a major portion of the aluminum to aluminum chloride and to form a valuable and directly usable zinc-copper-aluminum alloy product. According to a further embodiment of the invention, the aluminum chloride product is oxidized with steam to yield a high purity alumina (aluminum oxide) product and hydrochloric acid by-product.

As used herein, the term brass scrap includes chips, filings, fragments, turnings, etc., of commercial brass (copper-zinc) alloys, including such scrap metals which are contaminated with other impurity metal scrap materials such as iron, steel, etc., cutting oils, dirt and other impurities. The term also includes brass alloys which contain other trace alloy elements such as tin and lead. For example, and not by way of limitation on the scope of this term, brass tube scrap containing the following percentages of metals may be effectively employed in the practice of the present invention:

| Component | Weight % |
|---|---|
| Copper | 69 |
| Zinc | 28 |
| Lead | 2 |
| Tin | 1 |

The cuprous chloride reagent/raw material of the processes of the present invention may be obtained from any of the known prior art processes which involve the manufacture of a cuprous chloride intermediate product in the winning of copper from its ores, concentrates and scraps, including, without limiting the generality of the foregoing, the so-called Cymet process and the process of my prior issued U.S. Pat. No. 3,853,543, entitled "Process for Producing Elemental Copper by Reacting Molten Cuprous Chloride with Zinc".

The process of the present invention is best understood by reference to the accompanying drawing. Referring to FIG. 1, which depicts for purposes of illustration and not by way of limitation, the general features of the process of the present invention, solid cuprous chloride 10 is contacted with molten brass scrap 11 in a suitable high-temperature retort 12 which is refractory lined to withstand the temperatures involved. Advantageously, the vessel 12 can be the melting furnace in which the brass scrap is initially melted to produce the molten raw material 11. In this operation, because of the exothermic nature of the reaction, it is important that the cuprous chloride 10 be added as a solid to the molten brass scrap 11, rather than mixing molten cuprous chloride with the molten brass scrap or rather than adding molten brass scrap to solid cuprous chloride. By dispensing the solid cuprous chloride onto the surface of the molten brass at a carefully controlled rate, localized high concentrations of zinc are avoided and the temperature of the melt can be controlled and spattering and other practical difficulties can be avoided. This procedure also avoids the problem of handling molten cuprous chloride which is extremely corrosive.

The reaction in the chloridizing furnace 12

$$2CuCl + Zn \rightarrow ZnCl_2 + 2Cu \quad [1]$$

The reaction proceeds to stoichiometric completion, with zinc chloride fume 13 exiting the top of the chloridizing vessel 12 and with molten elemental copper 14 being withdrawn as the underflow. The ZnCl₂ fume 13 may and usually will contain small quantities of CuCl.

The copper product 14 is sufficiently pure to serve directly as the feed to an electro-refining step for conversion to wire bar or for conversion to various copper alloy products.

The ZnCl₂ fume 13 containing CuCl as an impurity is conducted through a heat-exchanger where most of the CuCl is condensed and recycled to the chloridizing zone 12. The ZnCl₂ fume is then condensed in a second heat-exchanger and contacted with aluminum scrap 16 in the reduction zone 15 to reduce the zinc and produce an aluminum chloride fume product 17. The reactions involved are:

$$3ZnCl_2 + 2Al \rightarrow 2AlCl_3 + 3Zn \quad [2]$$

$$3CuCl + Al \rightarrow AlCl_3 + 3Cu \quad [3]$$

The underflow product 18 from the reduction vessel 15 is a Zn-Cu-Al alloy, the composition of which is adjusted in a separate furnace by adding additional Cu or Al as desired.

The AlCl₃ fume 17 can, optionally, be subjected to redistillation 19 and recovered directly as a high purity AlCl₃ product 21 (as indicated by the dashed lines).

Alternatively, in accordance with the presently preferred embodiment of the invention, the AlCl₃ fume 17 is reacted with steam 22 in an oxidation vessel 23, in accordance with art recognized techniques. The oxidation reaction is:

$$2AlCl_3 + 3H_2O \rightarrow Al_2O_3 + 6HCl \quad [4]$$

The following examples are presented to further illustrate the invention and the presently preferred embodiments thereof.

The yellow brass scrap raw material (turnings, filings and chips) is first passed over a magnet to remove any tramp iron. The material is then given a detergent wash to remove accumulated oil and grease (normally about 5% to 6%), after which it is thoroughly rinsed and dried. The yellow brass has a typical analysis as follows:

|    | Weight % |
|----|----------|
| Cu | 65       |
| Zn | 32       |
| Pb | 2        |
| Sn | 1        |

The washed brass scrap is melted in a coreless induction furnace of approximately 2,000 pound capacity. 2,000 pounds of brass scrap are melted down in approximately one hour. The molten brass is skimmed to remove surface dross, after which a hood is lowered over the furnace in order to protect against air oxidation. Cuprous chloride crystals are then mechanically scattered over the surface of the molten brass through a trap door in the hood. These crystals are added at a rate to control the reaction and maintain temperature of the melt to approximately 2000 F.

The zinc in the brass scrap reacts immediately with the cuprous chloride to form zinc chloride fumes and metallic copper. The copper dissolves in the yellow brass melt.

The zinc chloride fumes are exhausted through a vent in the hood. At the high temperatures involved an appreciable amount of cuprous chloride also fumes off with the zinc chloride, normally about 5%. The combined fumes are vented from the hood and through a heat exchanger where they are cooled to approximately 1500 F. At this temperature the cuprous chloride fumes are differentially condensed and allowed to drip back into the furnace. The zinc chloride fumes are conducted through a second heat exchanger, cooled to about 650 F. and collected in a second enclosed furnace as molten zinc chloride. A majority of the cuprous chloride will be condensed and recycled back into the scrap melting furnace. However, some will continue on with the zinc chloride fumes and be condensed and dissolved in the molten zinc chloride. This can be controlled so as not to be in excess of 1%.

There are at least three important advantages of using yellow brass scrap as the raw material to reduce cuprous chloride. First, yellow brass is one of the cheapest and most abundant of copper scraps on the market. Second, the copper in the brass buffers the reaction and makes it readily controllable. If pure zinc is used, the reaction is intense immediately around the zinc. Therefore, the zinc has to be added carefully and with agitation in order to prevent localized overheating. The zinc in the brass scrap, however, is disseminated throughout the copper and is shielded from violent reaction with the cuprous chloride. This permits a larger amount of zinc in the form of copper brass to be added than would be possible otherwise. Third, the copper in the scrap not only serves as a buffer, but is recovered as a marketable secondary copper considerably more valuable than it was in the form of brass scrap. The copper so obtained will normally contain about 1% zinc. However, the copper is oxygen-free and is otherwise very clean and, therefore, brings a good price in the secondary market.

The molten zinc chloride in furnace No. 2 is reacted with high-purity aluminum. The aluminum is added to the furnace in small pieces and at a rate to control the reaction and maintain the temperature in the furnace to approximately 1100 F. The aluminum reacts with the zinc chloride to product aluminum chloride fumes and metallic zinc. The zinc collects in the bottom of the furnace where it is eventually tapped from the furnace. The aluminum chloride fumes are vented from the furnace. At the working temperature of 1100 F. some zinc chloride will also fume off with the aluminum chloride. This is normally in the range of 10%.

These combined fumes are drawn through a heat exchanger and cooled to approximately 400 F. At this temperature the zinc chloride is differentially condensed and allowed to drip back into the furnace. This selective condensation of the zinc chloride is remarkably effective. The aluminum chloride fumes are essentially stripped of zinc chloride and pass into a large cone shaped sheet metal chamber made of 3/16 inch mild steel. The aluminum chloride fumes sublime on the walls of the chamber as solid aluminum chloride. The metal walls of the chamber are periodically vibrated. The aluminum chloride is released and drops into the cone section. The material is then withdrawn, crushed and stored in airtight drums as marketable anhydrous aluminum chloride.

The zinc tapped from this furnace will contain some aluminum, generally about 2% to 3%. This cannot be avoided as aluminum is very soluble in zinc and a portion will remain in the zinc and not react with the ever decreasing amount of zinc chloride.

The reactions in this process are conducted batchwise and do not lend themselves to continuous operation because of the virtual impossibility of preventing a major dilution of the end products with the reactants. As mentioned above, a small amount of cuprous chloride will carry over with the zinc chloride. This cuprous chloride will also react with the aluminum and produce aluminum chloride and copper. This copper, which will be in an amount of less than 1%, will remain in the zinc.

The zinc containing these small amounts of aluminum and copper is tapped from the furnace and poured into another furnace where sufficient aluminum and copper are added to bring the zinc up to the specifications of the commercial zinc alloy known as "zamac". This is one of the most used zinc alloys, and the highest priced. The analysis of zamac is zinc 95%, aluminum 4% and copper 1%.

This process takes advantage of two simple chemical reactions, applied as described above, to convert a low priced copper scrap into valuable products. The unavoidable contaminants of aluminum and copper are here controlled so as to obtain a zinc alloy most valuable because it contains these two metals.

The foregoing example is presented for illustrative purposes only and to identify for those skilled in the art the presently preferred embodiment of the invention. As such, the process formulations, temperatures and other process conditions can be varied widely according to art-recognized techniques.

Having described my invention in such terms as to enable those skilled in the art to understand and practice it and having identified the presently preferred embodiments thereof, I claim:

1. A process for reacting brass and cuprous choloride to separate an elemental copper product and form a molten zinc-copper-aluminum alloy product, comprising the steps of:
   (a) contacting solid cuprous chloride with a melt of brass scrap in a chloridizing zone
      (i) to convert zinc in the brass scrap to a zinc chloride fume containing a minor amount of cuprous chloride, and
      (ii) to form a molten elemental copper product containing the major portion of copper values in the brass scrap and the cuprous chloride;
   (b) separating the zinc chloride fume containing cuprous chloride from the molten copper product;
   (c) condensing the zinc chloride fume containing cuprous chloride to the molten state;
   (d) contacting the molten zinc chloride containing cuprous chloride in a reduction zone with aluminum scrap,
      (i) to convert a major portion of the aluminum in said scrap to an aluminum chloride fume, and
      (ii) to form a molten zinc-copper-aluminum alloy product containing a minor proportion of the copper values of the cuprous chloride reactant; and
   (e) separating the alloy product from the aluminum chloride fume.

2. Process of claim 1 in which the aluminum chloride fume is contacted with steam in an oxidation zone,
   (i) to convert the aluminum chloride to an aluminum oxide product, and
   (ii) to form a hydrochloric acid by-product.

* * * * *